United States Patent
Pastrana et al.

(10) Patent No.: US 7,738,393 B2
(45) Date of Patent: Jun. 15, 2010

(54) METHOD AND DEVICE FOR EVALUATING DEGRADATION OF QUALITY CAUSED BY AN INVARIANCE OF A STIMULUS, AS PERCEIVED BY A RECIPIENT OF SAID STIMULUS

(75) Inventors: Ricardo Pastrana, Rennes (FR);
Catherine Colomes, Domloup (FR);
Emmanuel Wyckens, Saint Medard sur Ille (FR)

(73) Assignee: France Telecom, Paris (FR)

( * ) Notice: Subject to any disclaimer, the term of this patent is extended or adjusted under 35 U.S.C. 154(b) by 131 days.

(21) Appl. No.: 11/910,156

(22) PCT Filed: Mar. 10, 2006

(86) PCT No.: PCT/FR2006/000555

§ 371 (c)(1),
(2), (4) Date: Mar. 7, 2008

(87) PCT Pub. No.: WO2006/103327

PCT Pub. Date: Oct. 5, 2006

(65) Prior Publication Data

US 2008/0316933 A1    Dec. 25, 2008

(30) Foreign Application Priority Data

Mar. 29, 2005  (FR) .................................. 05 03053

(51) Int. Cl.
*H04L 12/26* (2006.01)

(52) U.S. Cl. ...................... 370/252; 348/180; 348/192

(58) Field of Classification Search ................. 370/252; 348/180, 192

See application file for complete search history.

(56) References Cited

U.S. PATENT DOCUMENTS

| 5,687,250 | A | * | 11/1997 | Curley et al. ............... 382/112 |
| 6,091,447 | A | * | 7/2000 | Gershfeld ................... 348/180 |
| 6,496,221 | B1 | * | 12/2002 | Wolf et al. .................. 348/192 |
| 2001/0033236 | A1 | * | 10/2001 | Iori et al. ..................... 341/51 |
| 2002/0181598 | A1 | * | 12/2002 | Vetro et al. ............ 375/240.27 |

OTHER PUBLICATIONS

Pastrana-Vidal et al. "Frame Dropping Effects on User Quality Perception" Apr. 21, 2004, Conference Wiamis, Lisbonne.

* cited by examiner

*Primary Examiner*—Ricky Ngo
*Assistant Examiner*—Rasheed Gidado
(74) *Attorney, Agent, or Firm*—Westman, Champlin & Kelly, P.A.; David D. Brush

(57) ABSTRACT

A method and apparatus are provided for evaluating a quality, as perceived by a recipient, of a signal carrying a stimulus. The method includes a step for detecting absences of variation of said signal and a step of quantifying at least one deterioration corresponding to an absence of variation. The quantity of deterioration computed during the quantification step depends on an amplitude of variation of the stimulus immediately following the concerned absence of variation. The method and apparatus enable the correlation of the duration of variance, possible past of invariances and a sudden variation of amplitude following said in variance, in implementing an automatic technique in real time, for example.

16 Claims, 3 Drawing Sheets

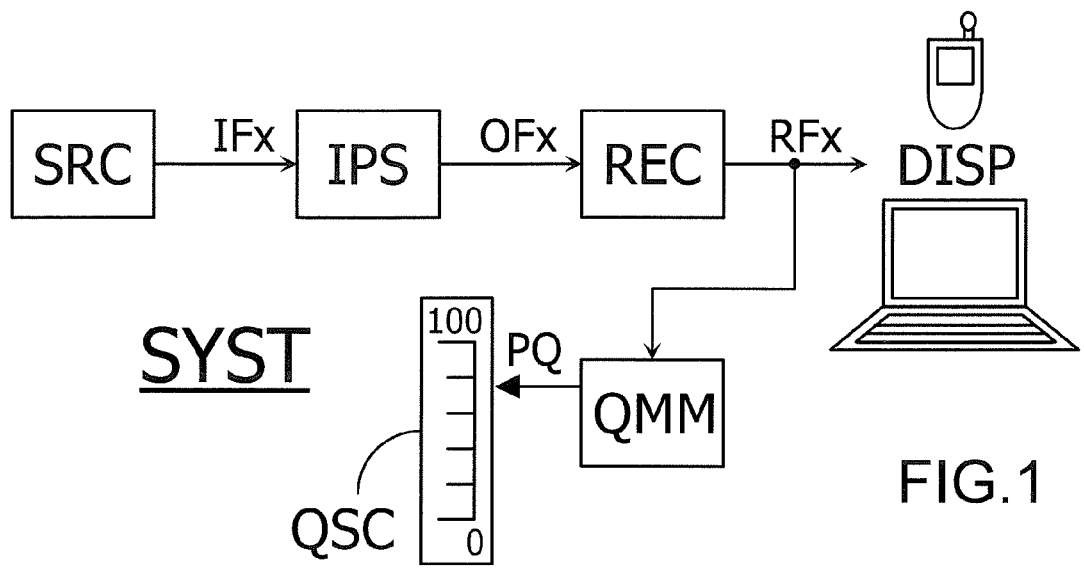
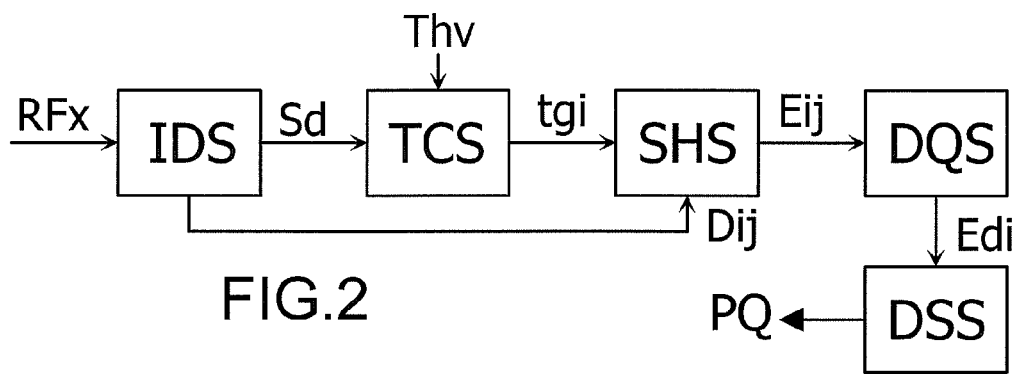
FIG.2
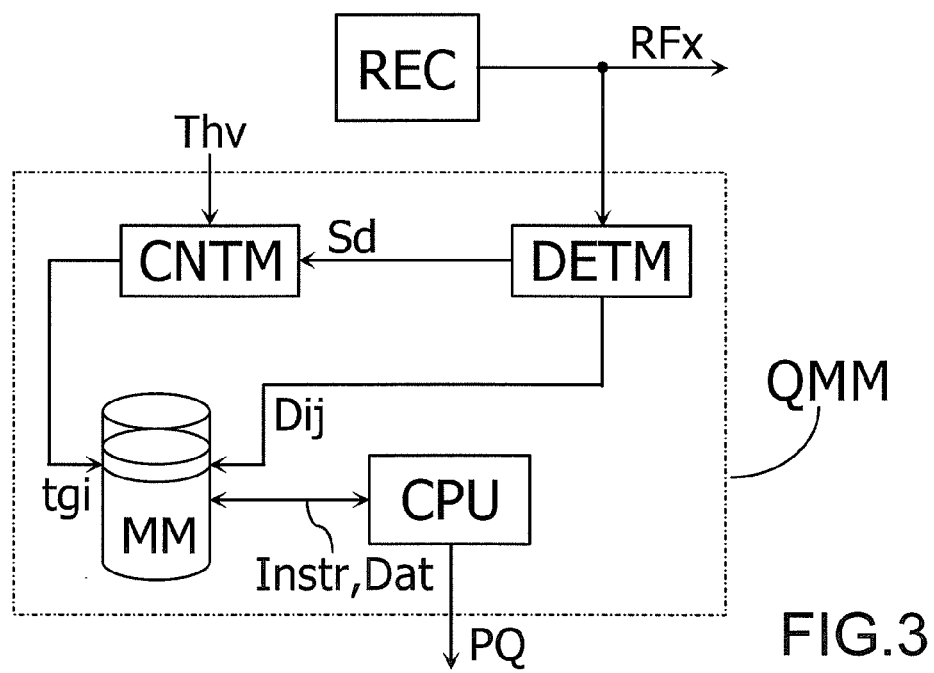
FIG.3

METHOD AND DEVICE FOR EVALUATING DEGRADATION OF QUALITY CAUSED BY AN INVARIANCE OF A STIMULUS, AS PERCEIVED BY A RECIPIENT OF SAID STIMULUS

CROSS-REFERENCE TO RELATED APPLICATION

This Application is a Section 371 National Stage Application of International Application No. PCT/FR2006/000555, filed Mar. 10, 2006 and published as WO 2006/103327 A1 on Oct. 5, 2006, not in English.

FIELD OF THE DISCLOSURE

The present disclosure relates to a method of evaluation of a value representing a quality, as perceived by a recipient, of a signal carrying data representing at least one stimulus intended to be produced on said recipient Such methods are being studied with increasing attention inasmuch as systems are being developed for the targeted distribution of information specifically intended for individuals specifically identified as being recipients, such targeted distribution being novel as compared with the functioning of traditional distribution systems entailing indiscriminate broadcasting of information such as audiovisual programs carried, for example, by radioelectrical signals transmitted by wireless.

BACKGROUND

Targeted distribution systems whose use is possible in the present state of the art generally make use of a conversion of an analog signal, representing stimuli to be transmitted, into a digital data signal. Said conversion is usually followed by an encoding of said data in order to reduce the volume as far as possible without thereby in any way causing this data to suffer significant deterioration. The encoded data is designed to be transmitted by packets according to standardized transmission protocols such as the Internet IPv4 or IPv6 protocols. It has to be recognized however that, although these packet transmission protocols offer considerable advantages, which is what has made them successful, they are intrinsically a source of deterioration caused by the inevitable loss of certain data packets. Furthermore, whatever the chosen encoding technique, the goal would be a compression that cannot be obtained except by eliminating certain characteristics, deemed to be superfluous, of the stimuli to be encoded. Such compression would inevitably generate losses which could have a negative impact on the perception that a recipient will have of the stimuli transmitted to him in encoded form.

Now an individual who, for example, has subscribed to a service for the supply of audiovisual programs will be contractually entitled to expect a minimum level of quality of the images and sounds that are transmitted to him or her, so that a provider of this supply service would have to ensure that such demands are properly met. This cannot be achieved except by carrying out a relevant evaluation of the quality of the stimuli which will be restored to the recipient after transmission. This evaluation would have to be done in taking account of the specific human features of this recipient's faculties of perception.

Various methods have already been elaborated in the past for the separate evaluation of a quality of a signal carrying a stimulus such as a moving picture or a sound. These methods make use for example of a group of persons each of whom has to be exposed to said stimulus and is then requested to assign a grade representing its quality as this person would have perceived it. However, such methods require major logistics and are therefore costly to implement since they require that persons should be brought together in a controlled environment such as a test laboratory in a number sufficient so that a statistical mean of the grades assigned is effectively representative of a mean perception. Furthermore, such methods cannot be used for real-time measurement of quality as perceived by a subscriber at the reception of a stream of stimuli that he would have commanded, so that these methods are not adapted as such to quality control applications in the above-described systems for the targeted distribution of information.

It has also been noted, in the implementation of such methods, the perception that certain types of deterioration could have an impact, on the perception of a person, that cannot be totally decorrelated from a chronological context in which such a deterioration was made to occur. Among other harmful effects, a loss of one or more data packets could cause a discontinuity taking the form of a break in the fluidity of video sequences or a break in a sound signal. This is because, in the event of interruption or appearance of delays in a stream of data packets received by a reception decoder, a receiver usually provides a restoration in a loop of a same stimulus defined by data contained in a buffer memory included in this receiver, so that this stimulus will then be essentially invariant unto the new data packets enable a new stimulus to be reconstituted.

It has been observed that the impact of such discontinuity on the perception of the quality of a stimulus that a person exposed to this stimulus would have would be made to vary as a result firstly of the duration of this discontinuity and secondly of the number of discontinuities having previously affected this same stimulus and therefore having also been previously observed by this same person.

An article "FRAME DROPPING EFFECTS ON USER QUALITY PERCEPTION" published in a report of a WIAMIS conference in Lisbon in April 2004 thus proposes a method of automatic computation of a measurement quantity specifically intended to represent the impact, as perceived by a person exposed to a video signal, that would be produced by discontinuities in a data stream representing this video signal. This method enables the quantifying of a combination of the effects, firstly, of a unitary deterioration caused by each discontinuity and depending on the duration of this discontinuity and, secondly, a possible accumulation of such discontinuities.

The work by the inventors however has shown that a poor impression felt by a person exposed to an invariance of a stimulus depends not only on the duration of this invariance and possible preliminary invariances but also on the conditions in which the invariance disappears to the benefit of a resumption of a normal running of the exposure to the stimulus. This tends to show that the approach described here above is not entirely satisfactory.

SUMMARY

An aspect of the disclosure relates to a method of evaluation of quality of a stimulus that makes it possible not only to take account of an association made by a person exposed to said stimulus between a duration of invariance of this stimulus and a cumulated storage of prior invariances made unconsciously by this person but also to take account of an amplitude of discontinuity of the stimulus during a resumption of dynamic progress following the expiry of the duration of invariance. Said method can moreover be implemented automatically and in real time during the transmission and/or reception of a signal carrying data representing said stimulus.

Indeed, according to an embodiment of the invention, a method of evaluation according to the introductory paragraph includes a step of detection of at least one absence of variation of said signal and a step of quantification of a value of deterioration generated by at least one such absence of variation, said value of deterioration depending on an amplitude of variation of the stimulus immediately following the absence of variation concerned.

Through an embodiment of the invention, it is possible to take account of the particular effect produced on a person by the particular conditions of occurrence of a resumption of dynamic evolution of a stimulus after a duration of invariance of this stimulus. A high variation in amplitude will then be expressed by a major quantity of unitary deterioration which will produce a significant contribution that could be added to a quantification of the impact linked solely to the duration of invariance in an overall quantification of the impact that an absence of variation would have on a person exposed to the concerned stimulus.

In a first aspect of an embodiment of the invention, accumulated value of deterioration is computed during the quantification step in the form of a sum of quantities of unitary deterioration caused by absences of variation having, in common, a same duration of invariance, each quantity of unitary deterioration depending on an amplitude of variation of the stimulus immediately following the absence of variation concerned.

Through this first aspect of an embodiment of the invention, it is possible to take account of the cumulated effect produced on a person by a succession of absences of variation of the stimulus, these absences of variation being then listed through the durations of invariance associated with them.

According to one variant of this first aspect of an embodiment of the invention, the computation of the various densities of deterioration can be simplified by computing, for each of them, a mean value of the amplitudes of resumption observed after the various invariances presenting the duration of invariance considered, and then computing a quantity of mean unitary deterioration valid for all the cases of deterioration corresponding to this duration of invariance considered, and then in making a simple product between this quantity of mean unitary deterioration and the number of discontinuities having presented this duration of invariance during the interval of analysis in order to obtain a cumulated expression of the density of deterioration considered.

A method of evaluation according to this variant of an embodiment of the invention will then be characterized in that, during the step of quantification, a cumulated value of deterioration is computed during the step of quantification in the form of a product between, on the one hand, a quantity of unitary deterioration caused by absences of variation having in common a same given duration of invariance and, on the other hand, a total number of such absences of variation that have taken place in a predetermined interval of analysis, said method being one in which said quantity of unitary deterioration depends on a mean value, for said interval of analysis, of the amplitudes of the variations of the stimulus immediately following said absences of variation.

As explained here above, a poor impression felt by a person exposed to a discontinuity of a stimulus does not depend only on the duration of this discontinuity and on the variation in amplitude of the stimulus following an untimely absence of variation of this stimulus, but also on a possible succession in time of such discontinuities which tend to cause an unconscious accumulation of dissatisfaction. However, the inventors have observed that an unconscious accumulation such as this does not exceed a certain limit beyond which additional deterioration is no longer taken into account by the human mind which, in a way, reaches saturation. Another variant of an embodiment of the invention makes it possible to take account of such a phenomenon. This variant can then be implemented alternately or cumulatively with the previous one. According to this variant, a method as described above, furthermore includes a step of summation bounded by various densities of deterioration generated by the quantification step during the interval of analysis considered.

Furthermore, the absences of variation of a stimulus are not all necessarily perceptible to a person exposed to this stimulus. A method of evaluation of a quantity of quality as perceived by a human observer will therefore be advantageous by not taking account of such insignificant discontinuities so that the simulation of the human perception is more precise and at the same time consumes less computation resources. Another variant of an embodiment of the invention enables these considerations to be taken into account. This variant could be implemented alternatively or cumulatively with the preceding variance. According to this variant, the only absences of variation of said signal reported after the detection step are those having a duration of invariance greater than a predetermined duration.

As explained further above, an embodiment of the invention is also noteworthy in that it can be used to quantify a measurement quantity in real time by automatic analysis of the signal whose quality is measured, and is therefore particularly well suited to quality control operations in systems of targeted distribution of information described in the introduction.

According to another of its aspects, an embodiment of the invention therefore also relates to a method of transmission of data representing at least one stimulus designed to be produced on a recipient, the method including:
  a step of encoding said data as a function of at least one configuration parameter, designed to produce an encoded signal adapted to a transmission,
  a step of evaluation of a quantity of measurement of quality of the encoded signal, designed to be executed in implementing a method of evaluation compliant with the above description, and
  a step of setting said configuration parameter as a function of at least one value of a measurement quantity produced during the execution of the evaluation step.

Such a use of an embodiment of the invention optimizes the value of the configuration parameter or parameters, for example a compression rate or a transmission bit rate, so as to ensure a minimum quality of the stimuli which will be produced on a recipient of the signal thus encoded while at the same time taking account possibly of constraints proper to the system such as the bandwidth that is still available, etc.

According to a first of its hardware aspects, an embodiment of the invention also relates to a device for evaluating a quantity representing a quality, as perceived by a recipient, of a signal carrying data representing at least one stimulus designed to be produced on said recipient, said device including means of detection of at least one absence of variation of said signal and means of quantification of a value of deterioration of the signal generated by at least one such absence of variation, said value of deterioration depending on an amplitude of variation of the stimulus immediately following the absence of variation concerned.

According to another of its hardware aspects, an embodiment of the invention also relates to an evaluation device in which the quantification means are designed to compute at least one cumulated value of deterioration in the form of a sum of quantities of unitary deterioration caused by absences of variation having in common a same duration of invariance, each quantity of unitary deterioration depending on an amplitude of variation of the stimulus immediately following the absence of variation concerned.

According to another variant of this other hardware aspect, an embodiment of the invention also relates to an evaluation device in which the quantification means are designed to compute at least one cumulated value of deterioration in the form of a product between, on the one hand, a quantity of unitary deterioration caused by absences of variation having a given duration of invariance and, on the other hand, a total number of such absences of variation that have taken place in a predetermined interval of analysis, said quantity of unitary deterioration depending on a mean value, for said interval of analysis, of the amplitudes of the variations of the stimulus immediately following said absences of variation.

In another particular embodiment of the invention, an evaluation device of this kind will furthermore advantageously include summing means bounded by various densities of deterioration generated by the quantification means during the analysis interval considered.

In yet another particular embodiment of the invention, such an evaluation device will furthermore include means of filtering absences of variation having durations of invariance smaller than a predetermined duration.

According to another of its hardware aspects, an embodiment of the invention also relates to a system of transmission of data representing at least one stimulus designed to be produced on a recipient, said system including:
means of encoding said data in a signal encoded in a format adapted to a transmission,
a device for the evaluation of a quantity of measurement of quality of the encoded signal, said device being compliant with the above description.

According to a particularly advantageous variant of this hardware aspect, the encoding means being designed for the application to the data of a processing defined by at least one configuration parameter, the system will furthermore include means to set said configuration parameter as a function of at least one value of the measurement quantity produced by the evaluation means.

Such a variant can be used to make a quality control loop in setting up a feedback control over on conditions of operation of the data encoding means at the quality level as perceived by the recipient of this data.

The evaluation method can be implemented in various ways, especially in hardware form or software form. An embodiment of the invention therefore also pertains to a computer program product downloadable via a telecommunications network and/or stored in a memory of a central processing unit and/or stored in a memory carrier designed to cooperate with a reader of said central processing unit, said program being designed to enable an evaluation of a quantity representing a quality, as perceived by a recipient, of a signal carrying data representing at least one stimulus designed to be produced on said recipient, said program includes at least one instruction defining a procedure of detection of at least one absence of variation of said signal and at least one instruction defining a procedure of quantification of a value of deterioration generated by at least one such absence of variation, said value of deterioration depending on an amplitude of variation of the stimulus immediately following the absence of variation concerned.

Such a program could furthermore include instructions defining procedures of computation of cumulated values of deterioration, summation bounded by various densities of deterioration, and filtering of discontinuities having durations of invariances too small to be perceptible by a human observer.

Finally, according to another of its hardware aspects, an embodiment of the invention also relates to a data carrier in which a computer program according to the above description is stored.

The above-mentioned characteristics as well as others shall appear more clearly from the following description of an exemplary embodiment, said description being made with reference to the appended drawings.

BRIEF DESCRIPTION OF THE DRAWINGS

FIG. 1 is a functional diagram representing a system of data transmission in which an embodiment of the invention is used.

FIG. 2 is a diagram of steps representing a method according to an embodiment of the invention.

FIG. 3 is a functional diagram representing means of evaluation capable of being implemented in such a system.

DETAILED DESCRIPTION OF ILLUSTRATIVE EMBODIMENTS

Figure 4:
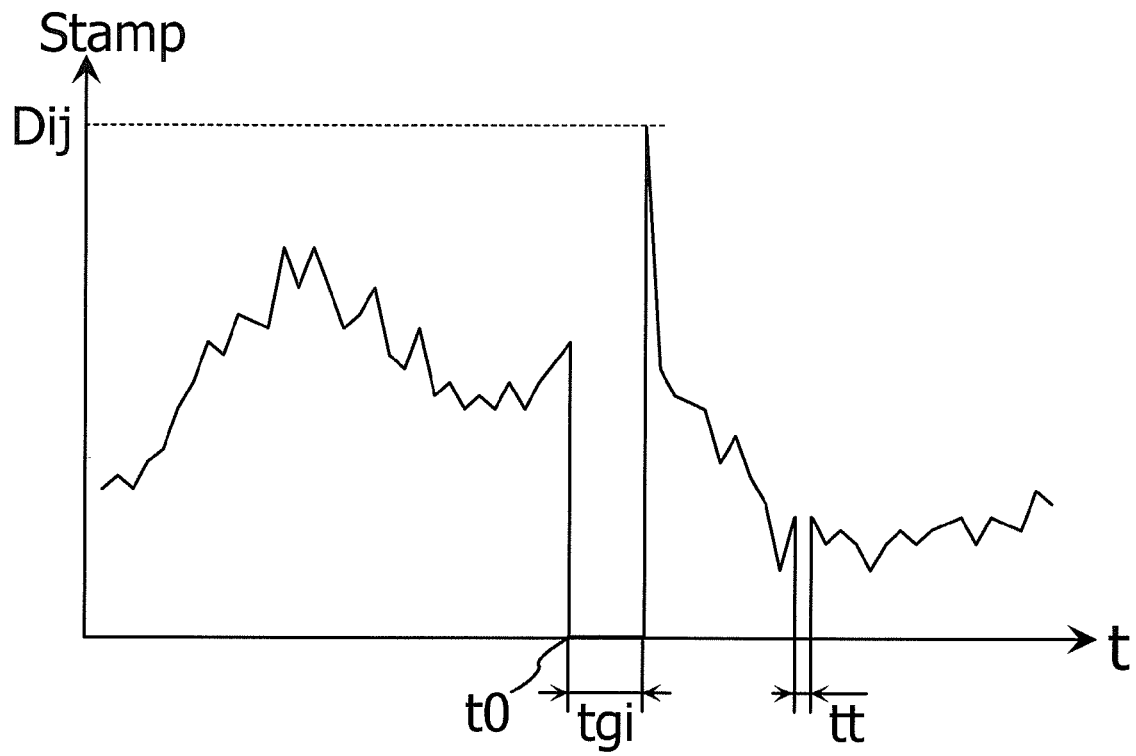
FIG. 4 is a response curve illustrating a break in continuity affecting a stimulus and being expressed by an invariance followed by an amplitude peak.

FIG. 1 schematically represents a data transmission system SYST that includes means SRC of generation of a digital data stream IFx called an input data stream representing at least one stimulus designed to be produced on a user of the system SYST by means of a terminal DISP consisting for example of a portable telephone or a screen which may or may not be linked to a computer and is preferably provided with at least one speaker, the transmitted stimuli being possibly sound and images either alternatively or in combination. The system SYST includes a distribution means IPS, for example a communications network including a plurality of routers capable of being driven to achieve a targeted dispatch of data included in the input stream IFx to the user's terminal DISP which is connected to a reception module REC designed to receive a digital data stream OFx called an output data stream, delivered by the distribution means IPS and potentially deteriorated (or degradated) by the distribution. In certain modes of implementation of an embodiment of the invention, the reception module REC could be constituted by a decoder capable of communicating with the terminal DISP through a wired or wireless link. In other modes of implementation of an embodiment of the invention, the reception module REC could be integrated into the terminal DISP. The system SYST described here furthermore includes an evaluation device QMM to evaluate a quantity of measurement of quality of a reception data stream RFx. This evaluation device QMM is conforming to an embodiment of the present invention and is capable of producing a measurement signal PQ having a value representing a real-time measurement of the quality perceived by the recipient of the stimulus conveyed by the reception data stream RFx by automatic analysis of the content of said stream. In the example shown here in, the value of the measurement signal PQ is related to an absolute scale of values QSC offering a range of variation going from 0 to 100. As will be seen here below, such an absolute and objective quantification of the value perceived by a user of the system SYST will, among other advantages, enable an optimization of the generation of the data stream sent to the user of the system SYST, designed to ensure minimum quality, for the user, of the stimuli that will be produced on him.

FIG. 2 illustrates a method of evaluation according to a particular mode of implementation of an embodiment of the present invention. This method is designed to produce a measurement signal PQ having a value representing the quality, as perceived by a recipient, of a signal carrying the reception data stream RFx representing at least one stimulus. This method includes a step IDS of detection of at least one absence of variation of the stimulus conveyed by the reception data stream RFx. This detection step IDS can be executed making a comparison, with a value substantially equal to zero, of a difference between two successive amplitudes of the stimulus, said detection step IDS producing a detection signal Sd having for example a logic level "1" when there is an absence of variation of the stimulus and a logic level "0" if this is not the case. A systematic computation, during the execution of the step IDS of detection, of a difference between two successive amplitudes of the stimulus conveyed by the reception data stream RFx will furthermore enable the quantification of a variation in amplitude Dij immediately following the duration of invariance considered. The method of evaluation according to this particular mode of implementation of an embodiment of the invention furthermore includes a computation and filtering step TCS during which there is computed a duration of invariance tgi associated with the absence of variation reported during the detection step IDS. This duration of invariance tgi is then compared with a predetermined threshold value Thv in order to perform a filtering of discontinuities having a duration of invariance that is too small to be perceptible to a human observer in choosing, for example, a predetermined threshold value Thv in the region of 40 milliseconds, with only discontinuities of a duration of invariance greater than the threshold value Thv being reported at the end of the computation and filtering step TCS. This method also includes a step SHS for the computation of a quantity of deterioration caused by at least one absence of variation reported during the computation and filtering step TCS, a step DQS of quantification of at least one density of deterioration Edi of the signal generated by absences of variation having in common a same duration of invariance tgi and a step DSS of summation of various quantities of deterioration Edi generated by the quantification step DQS, where said summation will preferably be bounded and will produce the value of the measurement signal PQ.

According to a possible mode of implementation of an embodiment of the invention, a sum of unitary quantities Eij associated with deteriorations all having a same duration of invariance tgi is computed during the quantification step DQS, each unitary quantity of deterioration Eij generated during the computation step SHS depending on the amplitude of variation Dij of the stimulus immediately following the absence of variation concerned.

In such a mode of implementation, each unitary quantity of deterioration Eij caused by an absence of variation of duration tgi followed by a sudden variation in amplitude Dij could for example be computed during the computation step SHS in the form:

$$Eij(tgi, Dij) = Qref - Mmax + \left( \frac{Mmax - Mmin}{1 + \left( \frac{b}{tgi} \right)^s} \right) + a \cdot Dij$$

In the expression of the unitary quantity of deterioration Eij given here above, a quality reference quantity Qref is cut down by a value that evolves in a way that is continuous, decreasing and bounded as a function of the duration of invariance tgi. A value a Dij proportional to the variation in amplitude Dij immediately following the discontinuity observed is added to said quality reference quantity Qref. This value Dij itself may also furthermore be preliminarily limited to a value $Dij_{MAX}$ to take account of a phenomenon of saturation of human perception. The quality reference quantity Qref for its part will have been preliminarily defined ones and for all by statistical analysis of the perceptions of a group of persons exposed in a laboratory to a reference stimulus.

Each density of deterioration Edi generated by the absences of variation having in common a same duration of invariance tgi could then for example be computed during the quantification step DQS in the following form:

$$Edi = \sum_j (Eij)^{P(n(tgi))},$$

which is a particular expression in which each unitary density of deterioration Eij is, quite optionally, weighted by an exponent P(n(tgi)) which itself may be defined as showing an evolution that is continuous, decreasing and bounded as a function of a total number of absences of variation having the duration tgi as their duration of invariance, for example according to an exponential sigmoid function defined by a relationship of the type y=1/(1+exp(−x)), or a tangential sigmoid function defined by a relationship of the type y=tan h(x).

In a very specific embodiment of the invention, the function defining the exponent could also have the form:

$$P(n(tgi)) = Pmax - \left( \frac{Pmax - Pmin}{1 + \left( \frac{c}{n(tgi)} \right)^R} \right),$$

where c and R are real numbers and Pmax and Pmin will respectively be maximum and minimum values of the exponent P(n(tgi)).

The summation step DSS could then compute cumulated sum of all the densities of deterioration Edi quantified by the quantification step DQS. This sum will be subtracted from the quality reference quantity Qref to produce the value of the measurement signal PQ. The measurement signal PQ could then be expressed in the following form:

$$PQ = Qref - \sum_i Edi,$$

in which the cumulated sum $$\sum_i$$

Edi of all the densities of deterioration Edi could optionally be itself weighted by means of an exponent smaller than 1, for example ½, and will preferably be bounded at a value $Ed_{MAX}$ in a preferred mode of implementation of an embodiment of the invention, so as to take account of the phenomenon of saturation of human perception.

According to an advantageous variant of the above-described mode of implementation of an embodiment of the invention, a mean quantity of unitary deterioration Eim will be computed during the computation step SHS as a function of a mean value Dim, for the interval of analysis considered, of the amplitudes of variations Dij of the stimulus immediately following the absences of variation of duration tgi. The density of deterioration Edi could then be computed in the form of a product between this mean unitary quantity Eim on the one hand and a total number n(tgi) of such absences of variation that have taken place during a given interval of analysis on the other hand. This could be expressed through the following equations:

$$Eim(tgi, Dij) = Qref - M\max + \left(\frac{M\max - M\min}{1 + \left(\frac{b}{tgi}\right)^s}\right) + a \cdot Dim$$

and $Edi = n(tgi).Eim(tgi)^{P(n(tgi))}$, this latter expression being made equivalent to the expression $$Edi = \sum_j (Eij)^{P(n(tgi))}$$

by the fact that the mean value Dim of the amplitudes of the variations Dij is common to all the values of mean unitary deterioration.

FIG. 3 illustrates a possible embodiment of the device QMM for evaluation of quantity of measurement of quality of the reception data stream RFx which, in the example described here in, could be directly integrated in to the reception module referred to further above.

This evaluation device QMM includes a module DETM for detection of an invariance of the reception data stream RFx designed to produce a detection signal Sd having for example a logic level "1" when there is an absence of variation of the stimulus, and if not, a logic level "0".

The evaluation device QMM furthermore includes a counter and time comparator CNTM including counting means capable of being activated only when the detection signal Sd has a logic level "1" and means for the comparison of a final counting value equal to the duration of invariance tgi with a predetermined threshold value Thv in the region of 40 milliseconds. Should it happen that the duration of invariance tgi is lower than the threshold value Thv, the absence of variation detected by the module DETM will not be perceptible to a human observer, so that no additional action will be undertaken by the evaluation device QMM. If not, i.e. if the duration of invariance tgi is greater than or equal to the threshold value Thv, the value of the duration of invariance tgi will be transmitted to a temporal database both as data and as a variable for the addressing of a memory sector which will be specific to this duration of invariance tgi. This temporal database which is stored here in storage means MM could then receive, from the detection module DETM, a value measured by this module of the amplitude variation Dij immediately following the absence of variation considered, and store this value of amplitude variation Dij in the memory sector specific to the duration of invariance tgi.

To execute the steps of computation of quantities of deterioration, quantification of deterioration densities and summation described further above, the evaluation device QMM could include a programmable logic circuit appropriately configured to perform the computations required by the mode of implementation chosen by means of a wired logic. This solution offers high processing speed but is reconfigurable only with difficulty.

This is why, in the preferred embodiment of the invention described herein, the evaluation device QMM includes a central processing unit CPU designed to receive instructions Instr and data Dat stored in a data carrier which herein is indistinguishable from the storage means MM including the data base. Said storage means MM could then for example take the form of a hard disk drive, said instructions Instr defining the computation steps whose execution by the central processing unit CPU will enable the evaluation device QMM to generate the desired measurements signal PQ, the data Dat herein including especially the temporal data preliminarily stored in the database.

These instructions Instr could be easily modified if that proves to be necessary and could form a software program which could be downloaded into the data carrier if it is rewritable, as is the case for example for a hard disk drive, a CD-RW, a DVD-RAM or a magneto-optical disk. A data carrier including instructions Instr and data Dat could alternatively be distinct from the storage means MM including the temporal database and could then be detachable and consist for example of a CD-ROM or DVD-ROM type read-only disk furnished to the system user by a program supply services provider.

FIG. 4 is a timing diagram that illustrates an example of possible variations of an amplitude Stamp of a stimulus, for example an image or a sound. In the example shown here, the stimulus, starting from an instant t0, undergoes a break in continuity during which the amplitude Stamp of the stimulus concerned shows an absence of variation having a duration of invariance tgi. At an instant t0+tgi, the variations in amplitude resume and show an amplitude peak Dij which will have an influence on the way in which this discontinuity would be perceived by a person exposed to the stimulus concerned. This discontinuity could be detected in various ways, one of the most advantageous ones relying on a computation of a difference in amplitude Stamp(t+1)-Stamp(t) between two consecutive instants t and t+1. This approach furthermore makes it possible to detect the start of an absence of variation in t0, quantify the amplitude Dij of the peak immediately consecutive to said absence which will be given here by a value Stamp(t0+tgi+1)−Stamp(t0+tgi). Furthermore, while it is possible, in theory, to analyze any invariance mathematically detected by verification of a relationship Stamp(t+1)-Stamp(t)=0, it would be more realistic in practice to compare the duration of the invariance thus detected with a predetermined threshold value Thv which will advantageously represent faculties of human perception and will be chosen for example to be in the region of 40 ms. Any absence of variation showing a duration smaller than the threshold value Thv such as for example the duration tt represented in this particular example, will then be deemed to be imperceptible and will not be taken into account in the evaluation of the perceived quality.

The stimulus considered can take different forms. For example, if the stimulus concerned is an image, this amplitude peak would be a peak of luminance which could then be expressed in the form:

$$Dij = \frac{\left\{\frac{1}{N}\sum [I(x, y, t0 + tgi) - I(x, y, t0 + tgi + 1)]^2\right\}^{1/2}}{val_{peak}},$$

where $I(x, y, t0+tgi)$ represents the luminance of a pixel (x,y) forming the image at the instant $t0+tgi$, i.e. the last image before the resumption of the variations, $I(x, y, t0+tgi+1)$ represents the luminance of the image of the pixel (x,y) at the instant $t0+tgi+1$, i.e. the first image following the resumption of the variations, N is equal to a total number of pixels per image, and $val_{peak}=2^{nb}$, where nb designates a number of bits representing each pixel.

In another case where the stimulus considered is constituted by a sound, the amplitude peak following an absence of variation of this sound caused by an interruption in sound takes the form of a "click" highly perceptible to the person exposed to the sound. Such a sudden variation in the sound stimulus occurring immediately following a silence or a noise of very low amplitude can be computed, for example, by a standardized mean square error formula:

$$Dij = \frac{[s(t0 + tgi) - s(t0 + tgi + 1)]^2}{val_{peak}},$$

where $s(t0+tgi)$ may correspond to the sample at the instant $t0+tgi$ (last sample of the absence of the sound signal) or to its energy $E(t0+tgi)=(s(t0+tgi))^2$, and $val_{peak}=2^{nb}$ where nb designates a number of bits representing each sound sample.

Finally, it must be emphasized here that it is perfectly possible to envisage the computation of a mean value on a given interval of analysis, for example 10 seconds, of the different amplitude peaks Dij each following an absence of variation with a given duration of invariance tgi, in order to enable a simplification of the computations of density of deterioration as explained here above.

Similarly, numerous steps of quantification of cumulated values of deterioration can be done at regular intervals as and when a data stream progresses, each of these intervals having for example a same value as the 10-second interval mentioned here above. Thus, a weighting in time of values successively obtained for the measurement quantity concerned is also possible.

Figure 5:
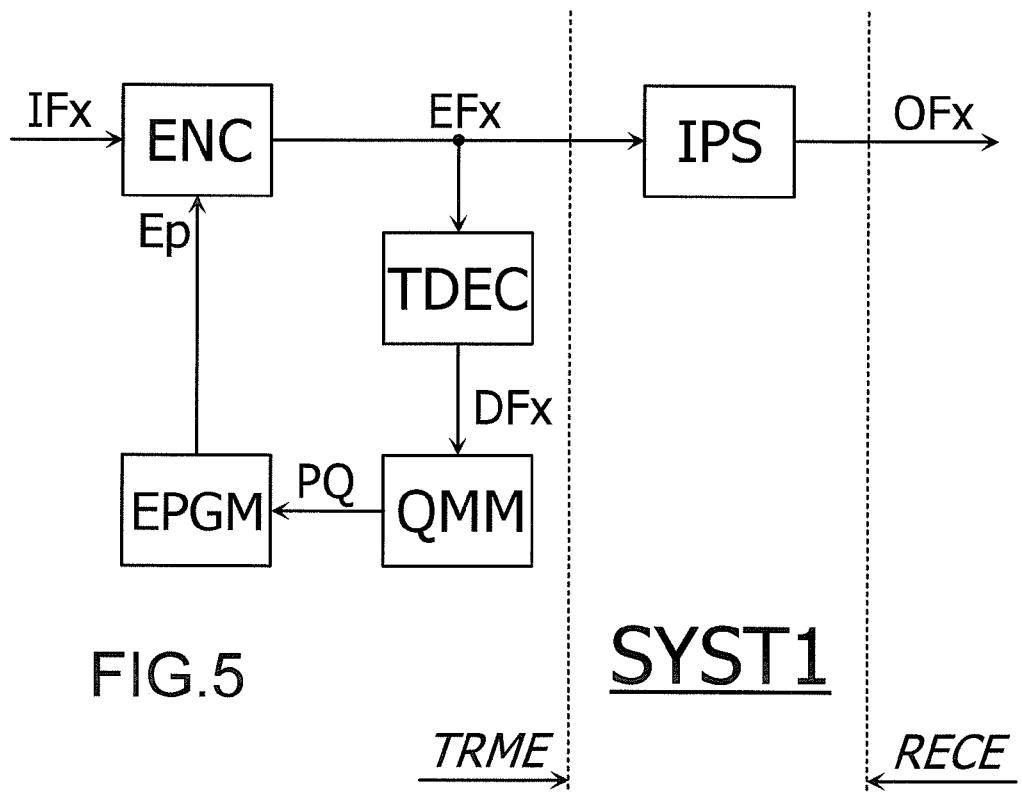
FIG. 5 is a functional diagram representing a system of data transmission in which a first variant of an embodiment of the invention is used.

FIG. 5 is a schematic view of a data transmission system SYST1 according to a first variant of an embodiment of the invention. This system SYST1 is designed for the transmission, between a sender part TRME and a receiver part RECE, of a data stream representing at least one stimulus. To this end, an input data stream IFx is encoded by encoding means ENC in an encoded data stream EFx designed to be transmitted via a distribution means IPS to the receiver part RECE which will receive it in the form of an output data stream OFx. The encoding means are designed to be configured by means of at least one configuration parameter Ep, for example a compression rate or a transmission bit rate whose value, determined by a generator of encoding parameters EPGM, will define the conditions in which the data encoding is done. The system SYST1 represented here furthermore includes a decoder called a sending decoder TDEC identical to a reception decoder, not shown herein, with which the receiver part RECE is provided for the purpose of decoding of the output stream OFx. Finally, the system SYST1 includes a device QMM for the evaluation of a measurement quantity representing the quality of the encoded data stream EFx, said device QMM being compliant with the above description and being designed to produce a measurement signal PQ. To evaluate the quality of the encoded data stream EFx, this evaluation device QMM, in this example of implementation of an embodiment of the invention, will carry out an analysis of the decoded data stream DFx representing the data stream that will be effectively used by the receiver part RECE to produce, in the user of the system SYST1, the stimulus that is intended for him. In the example shown here, an analysis of the decoded data stream DFx will produce a value of the measurement signal PQ which will drive the encoding parameters generator EPGM. This is done to optimize the value of the configuration parameter Ep so as to guarantee minimum quality for the stimuli that will be produced on the recipient of the output signal OFx and, at the same time, take account of constraints, if any, proper to the system such as the bandwidth still available, etc, which could also be communicated in the form of signals, not shown herein, to the encoding parameters generator EPGM. For example, if it appears that the quality as represented by the value of the measurement signal PQ is insufficient relative to the minimum qualities required, the value of a configuration parameter Ep defining a compression rate would be lowered so that said compression generates fewer information losses.

Figure 6:
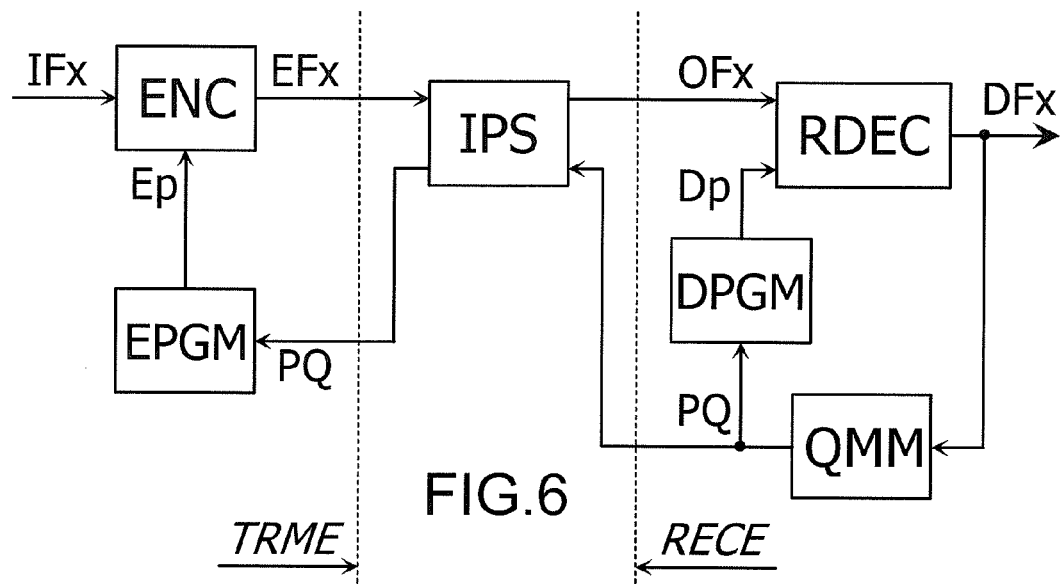
FIG. 6 is a functional diagram representing a system of data transmission in which a second variant of an embodiment of the invention is used.

FIG. 6 is a schematic view of a data transmission system SYST2 according to a second variant of an embodiment of the invention. This system SYST2 is designed for the transmission, between a sender part TRME and a receiver part RECE, of a data stream representing at least one stimulus. This system SYST2 comprises elements common with those described here above, said common elements then bearing the same reference signs. The system SYST2 represented here includes a reception decoder RDEC with which the reception part RECE is provided for decoding the output stream OFx. The system SYST2 furthermore includes an evaluation device QMM for the evaluation of a measurement quantity representing the quality of a decoded data stream DFx produced by the reception decoder RDEC, and therefore the quality of the encoded data stream EFx. Said device QMM is compliant with the above description and is designed to produce a measurement signal PQ which will drive firstly the encoding parameters generator EPGM to which this value will be transmitted in return via the distribution means IPS and, secondly, a decoding parameters Dp generator DPGM which will enable optimization of the configuration of the reception decoder RDEC with a view to further improving the quality of the stimuli that will be produced on the recipient of the decoded data stream DFx in adjusting for example the size of a buffer memory or the selectivity of an error filter used during the decoding.

Figure 7:
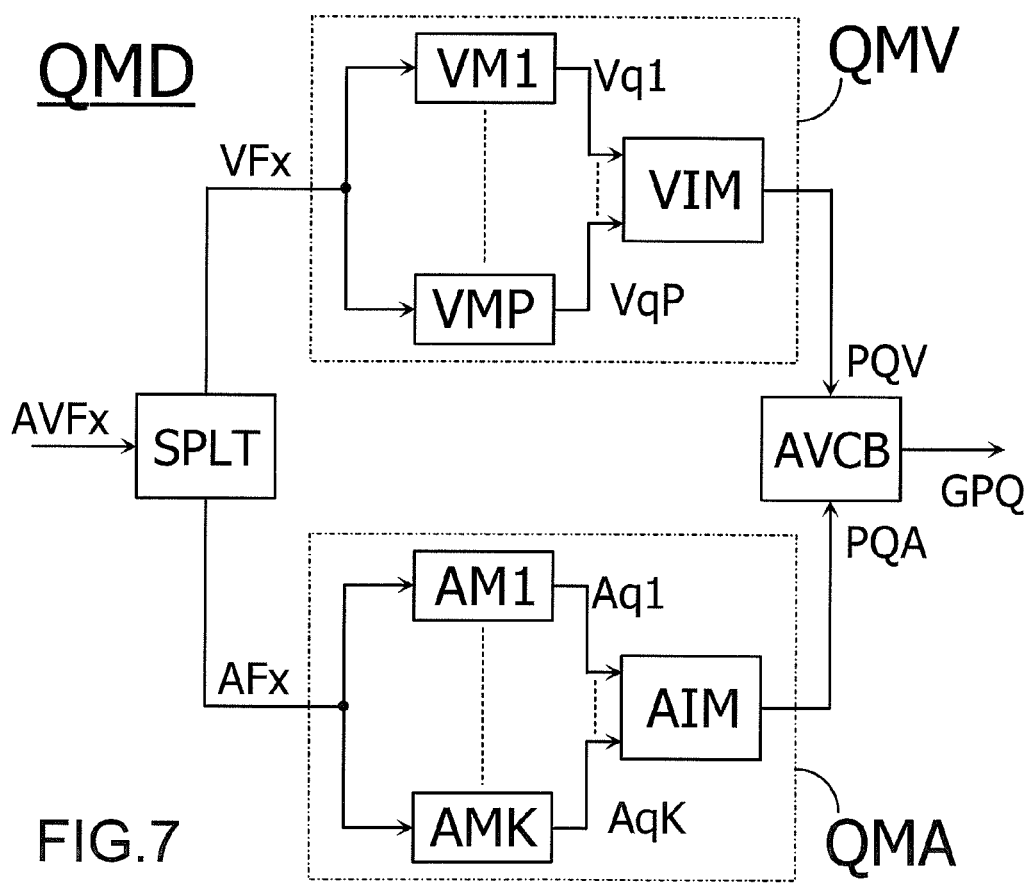
FIG. 7 is a functional diagram illustrating a possible application of an embodiment of the invention to the evaluation of the quality of audiovisual programs.

FIG. 7 schematically represents a module QMD for evaluating the quality of a data stream AVFx representing both audio stimuli and video stimuli. Such a stream is thus a carrier of an audiovisual program. This evaluation module QMD contains a stream separator SPLT designed for the extraction, from the data stream AVFx, of a first stream and a second stream VFx and AFx respectively carrying video data and audio data, the evaluation module QMD including first and second evaluation devices QMV and QMA each designed to evaluate a quantity PQV and PQA representing a quality, as it would be perceived in isolation by a recipient, of said first and second streams VFx and AFx. To this end, each of the first and second evaluation devices QMV and QMA contains first and second groups of different evaluation modules (VM1, ... VMP) and (AM1, ... AMK) of different quantities of measurement of quality (Vq1, ... VqP) and (Aq1, ... AqK), for example spatial or temporal qualities as perceived by a spectator of the audiovisual program. Each of the first and second evaluation devices QMV and QMA contains a module of association VIM and AIM of the values of these quantities of quality measurement (Vq1, ... VqP) and (Aq1, ... AqK), designed to produce a quantity PQV and PQA that takes account of a correlation which will be made by the spectator between the different quality factors concerned by these quantities. To this end, each association module VIM and AIM could compute a product between the values of the quantities of measurement quality (Vq1, ... VqP) and (Aq1, ... AqK). This product, as the case may be, could be raised to a power below one in order to achieve a weighting that represents a mechanism of human perception which is not linear.

In this embodiment of the invention, one of the evaluation modules (VM1, ... VMP) and (AM1, ... AMK) will take the form of an evaluation module compliant with the above description and designed to produce a measurement quantity representing deterioration caused by a break in continuity or untimely absences of variations affecting the audio and/or video stimuli carried by the data stream AVFx.

Finally, the quality evaluation module QMD comprises a combination module AVCB capable of receiving the values of the quantities PQV and PQA of measurement of quality of the first and second video and audio data streams VFx and AFx, and of combining these values according to a technique known to those skilled in the art in order to provide a signal GPQ representing an overall evaluation of the quality of the data stream AVFx as it will be perceived by a spectator of the audiovisual program defined by this data. This signal GQP could thus be expressed in the following form:

$GPQ = \alpha \cdot PQV + \beta \cdot PQA + \gamma \cdot (PQV \cdot PQA) + \epsilon$, where $\alpha, \beta, \gamma$ and $\epsilon$ are real numbers obtained once and for all by statistical analysis of perceptions of a group of persons exposed in a laboratory to variations in audio and video qualities of an audiovisual stimulus conveyed by a reference data stream.

Although the present disclosure have been described with reference to one or more examples, workers skilled in the art will recognize that changes may be made in form and detail without departing from the spirit and scope of the disclosure and/or the appended claims.

The invention claimed is:

1. A method of evaluation of a quantity representing a quality, as perceived by a recipient, of a signal carrying data representing at least one stimulus intended to be produced on said recipient, said method including:
   a step of reception of a signal carrying data representing at least one stimulus;
   a step of detection by an evaluation device of at least one absence of variation of said signal; and
   a step of quantification by an evaluation device of a value of deterioration of said signal generated by at least one such absence of variation, said value of deterioration depending on an amplitude of variation of the stimulus immediately following the absence of variation concerned.

2. The method according to claim 1, wherein, during the quantification step, at least one cumulated value of deterioration is computed in the form of a sum of quantities of unitary deterioration caused by absences of variation having, in common, a same duration of invariance, each quantity of unitary deterioration depending on an the amplitude of variation of the stimulus immediately following the absence of variation concerned.

3. The method according to claim 1, wherein, during the step of quantification, at least one cumulated value of deterioration is computed in the form of a product between, on the one hand, a quantity of deterioration caused by absences of variation having a given duration of invariance and, on the other hand, a total number of such absences of variation that have taken place in a predetermined interval of analysis, and wherein said quantity of deterioration depends on a mean value, for said interval of analysis, of the amplitudes of the variations of the stimulus immediately following said absences of variation.

4. The method according to claim 1, wherein the method furthermore includes a step of summation bounded by various densities of deterioration generated by the quantification step during the interval of analysis considered.

5. The method according to claim 1, wherein the only absences of variation of said signal reported after the detection step are those having a duration of invariance greater than a predetermined duration.

6. The method of claim 1 and further comprising transmission of data representing at least one stimulus designed to be produced on a recipient, the method including:
   a step of encoding said data as a function of at least one configuration parameter, designed to produce an encoded signal adapted to a transmission,
   a step of evaluation of a quantity of measurement of quality of the encoded signal designed to be executed in implementing a method of evaluation according to claim 1, and
   a step of setting said configuration parameter as a function of at least one value of a measurement quantity produced during the execution of the evaluation step.

7. A device for evaluating a quantity representing a quality, as perceived by a recipient, of a signal carrying data representing at least one stimulus designed to be produced on said recipient, said device including:
   means of detection of at least one absence of variation of said signal; and
   means of quantification of a value of deterioration of the signal generated by at least one such absence of variation, said value of deterioration depending on an amplitude of variation of the stimulus immediately following the absence of variation concerned.

8. The device according to claim 7, in which the quantification means are designed to compute at least one cumulated value of deterioration in the form of a sum of quantities of unitary deterioration caused by absences of variation having in common a same duration of invariance, each quantity of unitary deterioration depending on an amplitude of variation of the stimulus immediately following the absence of variation concerned.

9. The device according to claim 7, in which the quantification means are designed to compute at least one cumulated value of deterioration in the form of a product between, on the one hand, a quantity of unitary deterioration caused by absences of variation having a given duration of invariance and, on the other hand, a total number of such absences of variation that have taken place in a predetermined interval of analysis, said quantity of unitary deterioration depending on a mean value, for said interval of analysis, of the amplitudes of the variations of the stimulus immediately following said absences of variation.

10. The device according to claim 7, wherein the device furthermore includes summing means bounded by various densities of deterioration generated by the quantification means during the analysis interval considered.

11. The device according to claim 7, wherein the device includes means of filtering absences of variation having durations of invariance smaller than a predetermined duration.

12. A system of transmission of data representing at least one stimulus designed to be produced on a recipient, said system including:
   means of encoding said data in a signal encoded in a format adapted to a transmission,
   the device for the evaluation of a quantity of measurement of quality of the encoded signal of claim 7.

13. The system of transmission according to claim 12, wherein, the encoding means is designed for the application to the data of a processing defined by at least one configuration parameter, the system furthermore including means to set said configuration parameter as a function of at least one value of the measurement quantity produced by the evaluation means.

14. A computer system for evaluating a quantity representing a quality, as perceived by a recipient, of a signal carrying data representing at least one stimulus intended to be produced on said recipient, the system comprising:
   a computer-readable medium storing program code implementing the steps of: receiving a signal carrying data representing at least one stimulus,
      detecting at least one absence of variation of said signal, and
      quantifying a value of deterioration generated by at least one such absence of variation, said value of deterioration depending on an amplitude of variation of the stimulus immediately following the absence of variation concerned; and
   a processor, which executes the program code.

15. A computer readable memory encoded with a computer program comprising program code which, when executed by a processor implement a method comprising: evaluating a quantity representing a quality, as perceived by a recipient, of a signal carrying data representing at least one stimulus intended to be produced on said recipient, wherein evaluating comprises quantifying a value of deterioration of said signal generated by at least one absence of variation of said signal, said value of deterioration depending on an amplitude of variation of the stimulus immediately following the absence of variation.

16. A module for the reception of a signal carrying data representing at least one stimulus designed to be produced on a recipient, the module comprising: device for evaluating quantity representing quality of said signal, as perceived by said recipient, said device for evaluating including:
   means of detection of at least one absence of variation of said signal; and
   means of quantification of a value of deterioration of the signal generated by at least one such absence of variation, said value of deterioration depending on an amplitude of variation of the stimulus immediately following the absence of variation concerned.

* * * * *